United States Patent
Bedrosian et al.

(10) Patent No.: US 6,459,782 B1
(45) Date of Patent: *Oct. 1, 2002

(54) SYSTEM AND METHOD OF DEVELOPING MAPPING AND DIRECTIONS FROM CALLER ID

(75) Inventors: Bert Bedrosian; Marvin J. Thornsberry, both of Scottsdale; David Mark Barry, Prescott Valley, all of AZ (US)

(73) Assignee: Goldstar Information Technologies, LLC, Scottsdale, AZ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/437,375

(22) Filed: Nov. 10, 1999

(51) Int. Cl.$^7$ .......................... H04M 3/42; G01C 21/26
(52) U.S. Cl. .......................... 379/201.08; 379/201.01; 379/201.06; 379/88.21; 379/142.01; 379/142.06; 701/201
(58) Field of Search ................... 379/201, 912, 379/913, 207.15, 307.14, 201.03, 93.12, 93.23, 100.01, 127, 201.01, 88.21, 142, 142.06; 701/1, 25, 200, 201, 215, 213, 211, 209, 207

(56) References Cited

U.S. PATENT DOCUMENTS

| | | | |
|---|---|---|---|
| 3,943,526 A | | 3/1976 | Albertini et al. ............... 346/25 |
| 4,757,267 A | * | 7/1988 | Riskin .......................... 379/113 |
| 4,954,958 A | * | 9/1990 | Savage et al. ............... 364/444 |
| 5,097,528 A | | 3/1992 | Gursahaney et al. ... 379/142.15 |
| 5,109,399 A | | 4/1992 | Thompson ............. 379/201.08 |
| 5,197,009 A | * | 3/1993 | Hoffman et al. ............. 364/443 |
| 5,365,449 A | | 11/1994 | Kashiwazaki ............... 634/449 |
| 5,533,107 A | | 7/1996 | Irwin et al. ............. 379/201.01 |
| 5,546,447 A | * | 8/1996 | Skarbo et al. ............... 379/142 |
| 5,727,057 A | * | 3/1998 | Emery et al. ........... 379/201.07 |
| 5,734,706 A | | 3/1998 | Windsor et al. ........ 379/142.01 |
| 5,758,313 A | | 5/1998 | Shah et al. .................. 455/456 |
| 5,805,689 A | | 9/1998 | Neville .................... 379/220.01 |
| RE36,111 E | | 2/1999 | Neville ................... 379/127.01 |
| 5,878,126 A | | 3/1999 | Velamuri .................... 379/219 |
| 5,901,214 A | * | 5/1999 | Shaffer et al. ................ 379/220 |
| 5,903,228 A | * | 5/1999 | Ohgaki et al. ............... 701/202 |
| 5,904,727 A | | 5/1999 | Prabhakaran ............... 701/208 |
| 5,922,040 A | | 7/1999 | Prabhakaran ............... 701/117 |
| 5,934,406 A | | 8/1999 | Leta et al. ................... 379/120 |
| 5,941,930 A | * | 8/1999 | Morimoto et al. .......... 701/201 |
| 5,950,161 A | * | 9/1999 | Kozuma et al. ............. 704/260 |
| 6,029,069 A | * | 2/2000 | Takaki ........................ 455/414 |
| 6,049,272 A | | 4/2000 | Lee et al. .................... 340/539 |
| 6,085,097 A | * | 7/2000 | Savery et al. ............... 455/456 |
| 6,091,957 A | * | 7/2000 | Larkins et al. .............. 455/456 |
| 6,314,295 B1 | * | 11/2001 | Kawamoto .................. 455/456 |
| 6,317,684 B1 | * | 11/2001 | Roeseler et al. ............ 701/202 |

* cited by examiner

*Primary Examiner*—Fan Tsang
*Assistant Examiner*—Ovidio Escalante
(74) *Attorney, Agent, or Firm*—Gifford, Krass, Groh, Sprinkle, Anderson & Citkowski, P.C.

(57) ABSTRACT

A system is disclosed for generating instructions enabling navigation between an origin and a location identified by an address corresponding to data in an incoming communication, such as a customer name or customer telephone number. The system comprises a conventional caller identification unit that reads information transmitted in conjunction with an incoming customer telephone call. A main processor engine receives this information and searches a database for a match between the information and the customer's address. Once the customer's address is successfully located and retrieved by the main processor engine, the address is communicated to a mapping engine. The mapping or other direction-generating engine searches a database for data associated with the address that may be used by the mapping or other direction-generating engine to generate or directions a map between a predetermined point of origin and the address. Once the map is generated, it can then be displayed on a computer screen and/or printed.

34 Claims, 15 Drawing Sheets

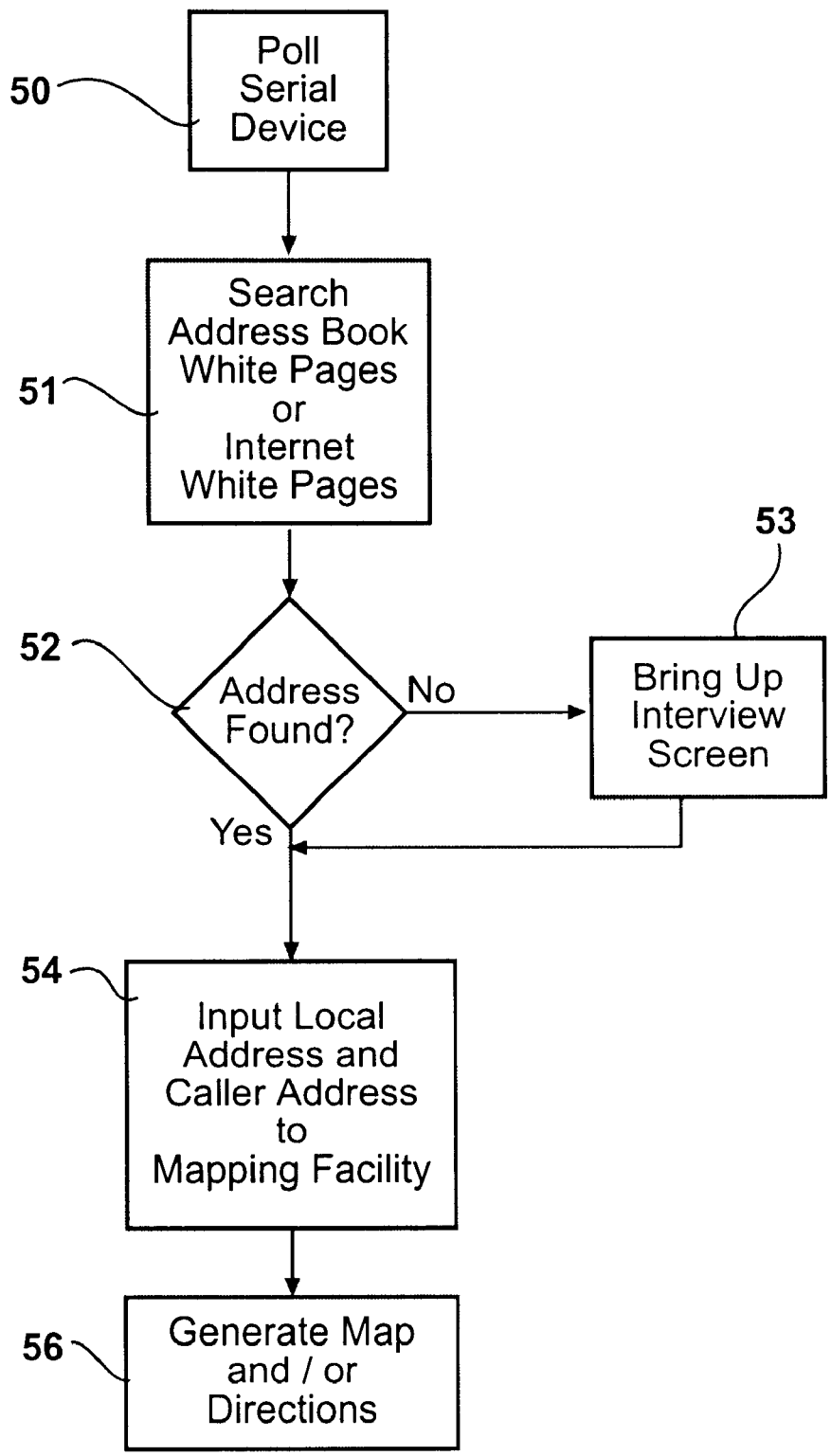

SYSTEM AND METHOD OF DEVELOPING MAPPING AND DIRECTIONS FROM CALLER ID

FIELD OF THE INVENTION

The present invention relates generally to navigation devices and methods and more particularly to a device and method for generating navigation instructions based on electronically retrieved input data.

BACKGROUND OF THE INVENTION

Many service businesses, such as delivering restaurants, furniture stores, mail order establishments and others, base a high percentage of their sales upon delivery of their services or products to the homes or workplaces of their customers. In most such cases, a customer will telephone the business and place an order for the service or product to be delivered. While this retail practice is highly convenient for the customer, the delivery of the service or product can create numerous inefficiencies that reduce the overall profit to the delivering business.

One such inefficiency arises during the telephonic ordering process. Typically, the customer must orally provide an employee of the business with the customer's address. This can result in a miscommunication between the customer and the employee resulting in the business recording an inaccurate address and delay in the delivery of the product or service. If instructions for finding the customer's location are given, this is another opportunity for miscommunication. Assuming the address of the customer is correctly recorded by the employee, the business must often locate the address on a map before dispatching a driver to the address. As can readily be imagined, this problem is particularly acute in large metropolitan areas. Even if the address is successfully located, many delivery drivers struggle with finding the most time- and/or cost-efficient route to the customer's address, if the driver is successful in reaching the customer's address at all.

The reverse situation arises when a customer calls an establishment that he or she plans to visit for the first time. The customer calling a restaurant for reservations or a store to inquire about availability of a product often could use reliable and detailed instructions for getting to the restaurant or store.

In other situations, businesses could benefit from improved navigation directions. A business having a central telephone facility for taking orders, for example by use of a toll-free number, may have numerous geographically widespread outlets from which deliveries are made. It would be desirable for the one central location receiving a customer's call to be able to, first, locate the outlet nearest the customer and, second, send to that outlet detailed directions from the outlet's location to the point of delivery.

Routing can be particularly difficult when numerous deliveries are to be made in a single trip. In that case, directions should include the most efficient ordering of delivery stops as well as detailed instructions from one stop to the next. Parcel, furniture and appliance deliveries are examples of deliveries in which a truck with numerous articles makes many stops throughout a day. These businesses would benefit from detailed point-to-point directions enabling routing of multiple stops during the course of one trip and back to the beginning point.

Certain information is, in fact, available to the telephone user. If not blocked by the caller, the caller ID service provided by telephone service providers can give the business call recipient the name and phone number of the caller. Also, dedicated telephone lines can be brought into a business for automatic number identification or "ANI." In no instance, however, is the recipient of a call afforded the information necessary to route a delivery. Also, navigational systems available for automobiles can give detailed directions from the automobile's location to a particular address. However, the address to which directions are needed must be input to the system, and the location to which navigational instructions are to be generated are not instructions to the location of a telephone caller.

Software and internet services for locating an individual's address as well as other information are available. These, however, do not respond automatically to an incoming or outgoing telephone call, nor do they generate navigational information such as detailed directions or maps that assist the user in navigating.

Map generating software is known. A computer user can input points A and B to have a map generated from the one point to the other. Again, the generation of the map is not the function of an incoming phone call, but must have its starting and ending points known to and introduced by the user.

Emergency services, called sometimes enhanced 911, may develop a set of instructions from a particular emergency service station to a caller using name and address supplied by the telephone service provider in the manner of caller ID. The enhanced 911 service is not located at the particular emergency service station. It forwards the detailed directions to the appropriate station, such as ambulance, fire or police location rather than automatically generating a set of instructions based upon the point of location of the incoming call and the point of location of the caller.

In addition to the day-to-day importance to a delivery business of rapid directions generation, these businesses would benefit from a demographics component that allowed analysis of the orders received by telephone. For example, a clustering of orders in one locale coupled with relatively few orders received from another locale could serve as the basis for increased advertising in the region generating fewer calls. Likewise, it would be useful to be able to analyze the types of products ordered in one location as opposed to another, or the dollar amount of orders as it varies from one region to another. Retrieval of a profile of the calling party is useful as well as a history of the party's previous orders or transactions.

Accordingly, a need exists for an improved system for generating accurate instructions that enable optimally efficient navigation to or from a business and that permits use of the information gathered for other business purposes.

SUMMARY OF THE INVENTION

In accordance with the present invention, a system and method is disclosed for generating instructions based upon an incoming communication enabling navigation between an origin of the communication and a location or business receiving it.

In a preferred embodiment of the invention, the system comprises a conventional caller identification unit that reads information transmitted in conjunction with an incoming customer telephone call. A main processor engine receives this information and searches at least one database for a match between the information and the customer's address. Once the customer's address is successfully located and retrieved by the main processor engine, the address is communicated to a mapping engine or other software capable of generating such navigational information as textual directions to the caller's location. The mapping engine searches a mapping database for data associated with the address that may be used by the mapping engine to generate a map between a predetermined point of origin and the address. Once the map is generated, it can then be displayed on a computer screen and/or printed on paper. Textual directions are similarly generated.

Preferably, in plotting a map and/or other detailed directions, the mapping or directions generating engine uses as a point of origin, the location of the installation receiving the incoming call. The map or directions generation may proceed directly from the caller ID or ANI information received with the incoming call by use of a software routine that queries a "white pages" type of database to find an address based upon the caller's name or telephone number as identified by the caller ID feature or by ANI. Preferably, however, the system searches first a database of customers compiled at the site of the incoming call, a delivery business for example. A current address there is used as a destination in map generation. If no current address information is found in the customer database, then the white pages software is resorted to for the generation of a map and/or instructions.

In one embodiment of the invention, a caller's address is supplied in the caller ID information from the telephone service provider. The systems and method of the invention automatically adopt that information, along with the address of the point of receipt of the incoming call, to generate the map and/or instructions.

In another embodiment, the software of the system chooses a branch or outlet nearest the call-in customer for delivery of an order. (The map or directions routing information is supplied to that particular branch or outlet.)

A further embodiment of this invention, which can be combined with the above-described features, uses reverse telephone directory data to locate the address of an establishment being called by an individual. The system then plots a map to the called location and/or generates detailed directions.

In addition to locating a caller and generating directions to facilitate delivery, an additional feature of the invention includes record keeping to provide a business with easy access to a history of sales. Additional features can include demographic analysis determining the locale where most purchase calls are generated, the particular items sold most in particular geographical regions, the dollar amount of sales to particular regions on a per call basis, and other business information useful for analytical and business planning purposes. Similarly, a history of previous transactions, time of day or day of the week, for previous transactions as well as customer profile information can be brought up and displayed either automatically or upon request of the business establishment.

Where the nature of the business is such that repeat orders are the norm, customer preferences can be brought up and displayed for the use of the operator who takes the order over the telephone. In business-to-business transactions involving product specifications or model numbers typically needed on an ongoing basis by a particular customer, this capability can greatly expedite the ordering process. The customer information and demographic information available in this way can give the small business many of the research and information gathering abilities previously available only to much larger and better capitalized enterprises. In an alternative arrangement, the installation and software that retrieves information such as mapping, directions, customer profile or customer history can be located at a site remote from both the calling and the called telephone. The information retrieval can be centralized in a business with numerous outlets, or the retrieval and delivery of such information can be supplied as a service by a third party such as a telephone service provider.

In still another alternative, a third party such as the telephone service provider retrieves information about a telephone subscriber whose telephone is involved in a call in progress and forwards that to either the calling or the called telephone situs which then uses the forwarded information to retrieve from a database there the complete information desired. An example is a retrieval by the telephone service provider of the latitude and longitude of the site of one of the caller and the call recipient, which latitude and longitude is then supplied to one of the call participants whose computer system uses the coordinates to generate a map and or directions.

Where neither caller ID, which may be blocked, nor the customer database turns up an address for a particular caller, a routine of the program implementing this system chooses an interview screen for display for the call answering operator. This then is completed based on questions put to the caller, the information is logged into the customer database and directions are generated for use in delivery.

The above and further features of the invention will better be understood from the following detailed description of a preferred embodiment when taken in consideration with the accompanying drawings.

BRIEF DESCRIPTION OF THE DRAWINGS

FIG. 3 is a flow chart of a computer program routine effecting the operation of the computer installation of FIG. 1 in accordance with a further embodiment of the present invention.

DESCRIPTION OF THE PREFERRED EMBODIMENT

Figure 1:
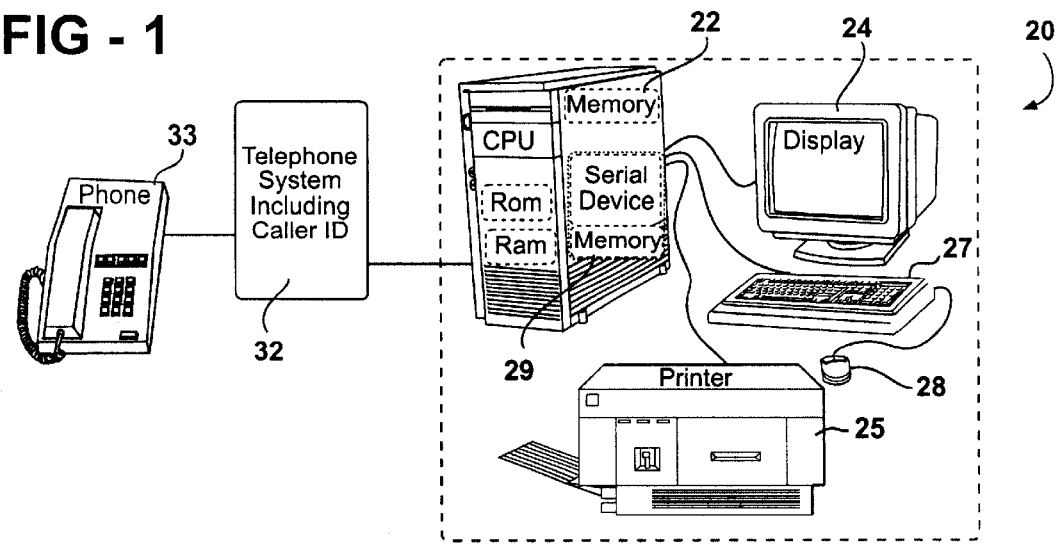
FIG. 1 is a block diagram of a computer installation suitable to respond to a telephone call in accordance with the present invention.

In FIG. 1, a computer installation 20 includes a computer 22 incorporating a CPU, read-only memory and random access memory. The computer 22 communicates in typical fashion with a display 24 and a printer 25. A keyboard 27 and a mouse 28 are parts of the computer installation 20, as is a serial device with memory 29, such as a modem or serial box. The computer installation 20 is connected via the serial device 29 to a telephone system 32 giving access to the computer installation 20 from a caller's phone 33. Among the programs and data contained in memory in the computer 22 are a telephone directory such as a "white pages" directory that is commercially available. Alternatively, the "white pages" telephone directory information may be available via a further phone line (not shown) connecting the computer 22 to the worldwide web. Also in memory in the computer 22 is a user-developed address book of addresses and telephone numbers of previous callers, customers, prospects, or the like. In addition, computer 22 has loaded into memory a map generation software package such as that provided by De Lorme under the name "Cyber-router." Alternatively, again the installation may be in communication with the worldwide web to access map generation available, for example, from "Map Quest.com, Inc." at www.MapQuest.com.

Figure 2:
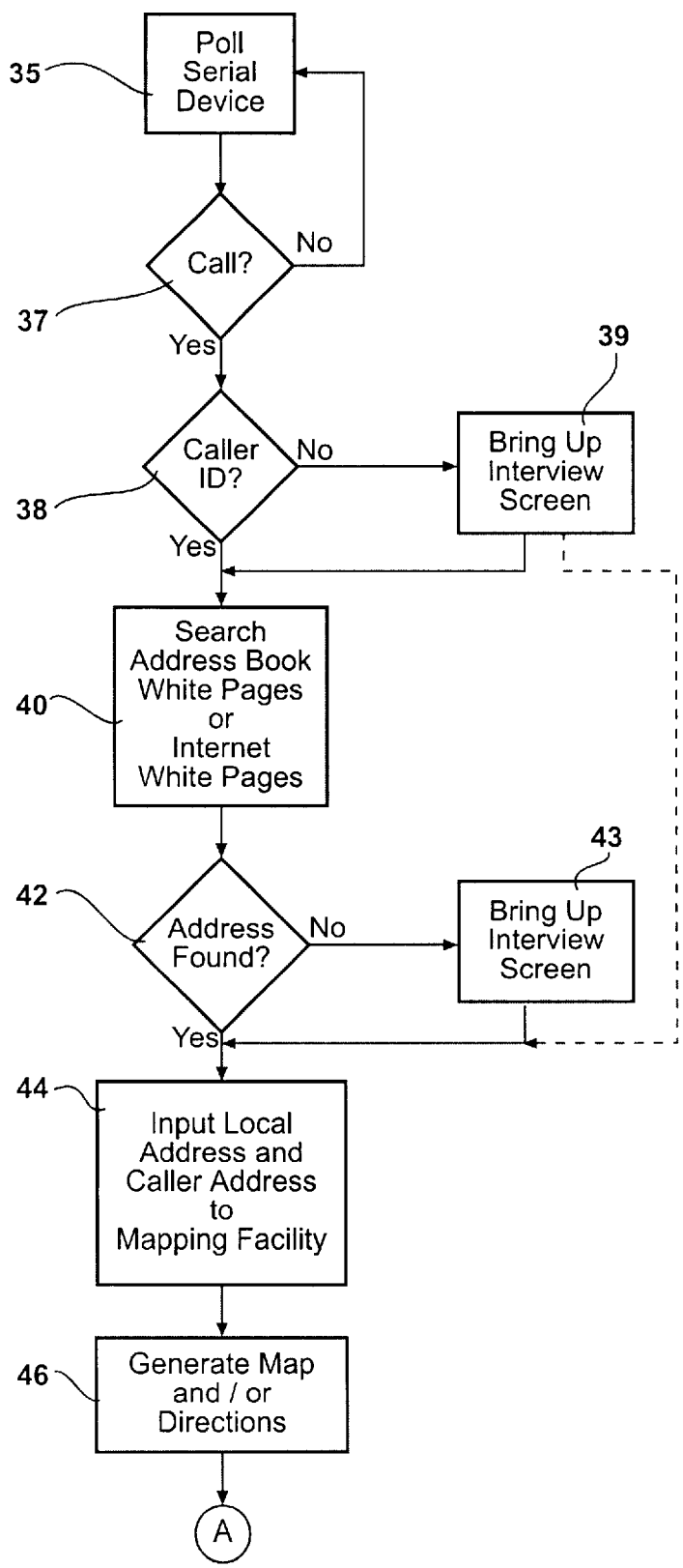
FIG. 2 is a flow chart of a computer program routine effecting the operation of the computer installation of FIG. 1 in accordance with the present invention.

Turning to FIG. 2, at block 35, a program routine shown there causes the computer 22 to poll the serial device 29 on a regular basis to detect an incoming call. As indicated at 37 and 38, upon detection of a call, the information communicated by the telephone system 32 is queried for caller ID information. This is accomplished by the computer 22 determining from the memory of serial device 29 the presence or absence of caller ID information communicated with each incoming telephone call signal received by the serial device 29.

As illustrated in FIG. 1, in a preferred embodiment, the serial device 29 consists of the internal modem of computer 22. Only when calls are placed from extensions unconnected with the computer 22 is an external modem or other serial device necessary. Where telephone and internet services are available by a cable installation, a cable modem or modems for the computer will serve as the serial device 29 and any internet link desired.

In the embodiment shown in FIG. 2, if a caller ID communication is present in a telephone call, as indicated at block 40 of FIG. 2, the program causes the computer 22 to search for an address associated with the caller ID information in the user's address book or in the white pages loaded into the computer memory or available from the worldwide web via the internet. On the other hand, if no caller ID information is detected in a call, as indicated at 39, an interview screen field 301 of a screen 300 (FIG. 8) is brought up on the display 24 permitting an operator at the computer installation 20 to interview the caller so as to determine the caller's name and telephone number. The operator enters this information via the keyboard 27. The program then reverts to block 40 to search the white pages for an address. Alternatively, at block 39 the interview field 301 can cause the operator to inquire as to the caller's address and enter that, whereupon the address information is input to the main program subsequent to block 40 as indicated by the broken lines in FIG. 2.

In the event that caller ID or similar information such as automatic number identification (ANI) affords address information, then this can be input directly as a destination for navigation instruction generation.

If it is determined at block 42 that an address has been found in the white pages, then that address is input to the mapping program of the computer installation 20 or via the internet. If no address is found in the white pages, then once again an interview screen 300 is brought up on display 24 for the operator at the computer facility to input an address using the keyboard 27 in cooperation with the display 24. This is indicated at block 43. The address determined in this fashion is then input to the mapping software at 44 and a map is generated at 46, at the printer 25, at the display 24, or at both. The information entered by the operator at block 39 or 32 is used to update the user's address book.

Figure 2A:
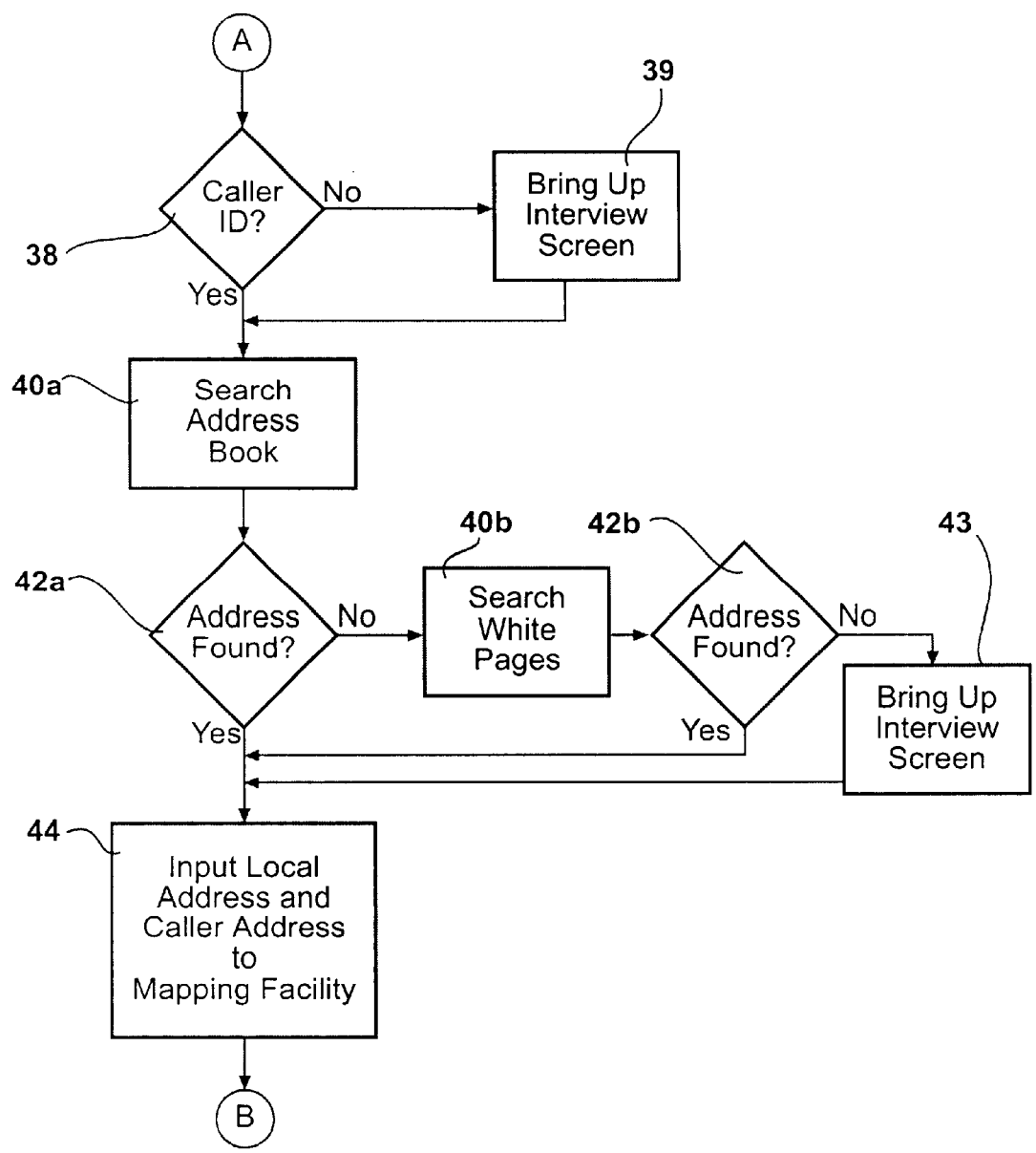
FIG. 2a is a flow chart of alternate steps in a program like that of FIG. 2.

As shown in FIG. 2a, in a preferred variation of the routines of FIG. 2, if at 38 a caller ID has been found, or if at block 39 a caller's name or number has been input by the local operator of the system 20, the address search is first conducted at 40a in the user's address book. Again, this is the address book of recent purchasers, prospects, or other current address information compiled by the proprietor of the computer installation from its own records, prior experience, or the like. If an address is found there, the decision is at block 42 to proceed as previously to block 44 inputting both the computer installation's address and the uncovered caller address to the mapping facility. However, if no address is found in the address book, the decision block 42 initiates a search in the white pages contained in memory in the computer installation or via the internet at 40b. If an address is then found, again, the decision is made at 42b to proceed to the mapping facility at block 44. However, if no address is found in the white pages, the interview screen is brought up for the local operator to complete and in that way the necessary address information is input and the program continues as previously.

Figure 2B:
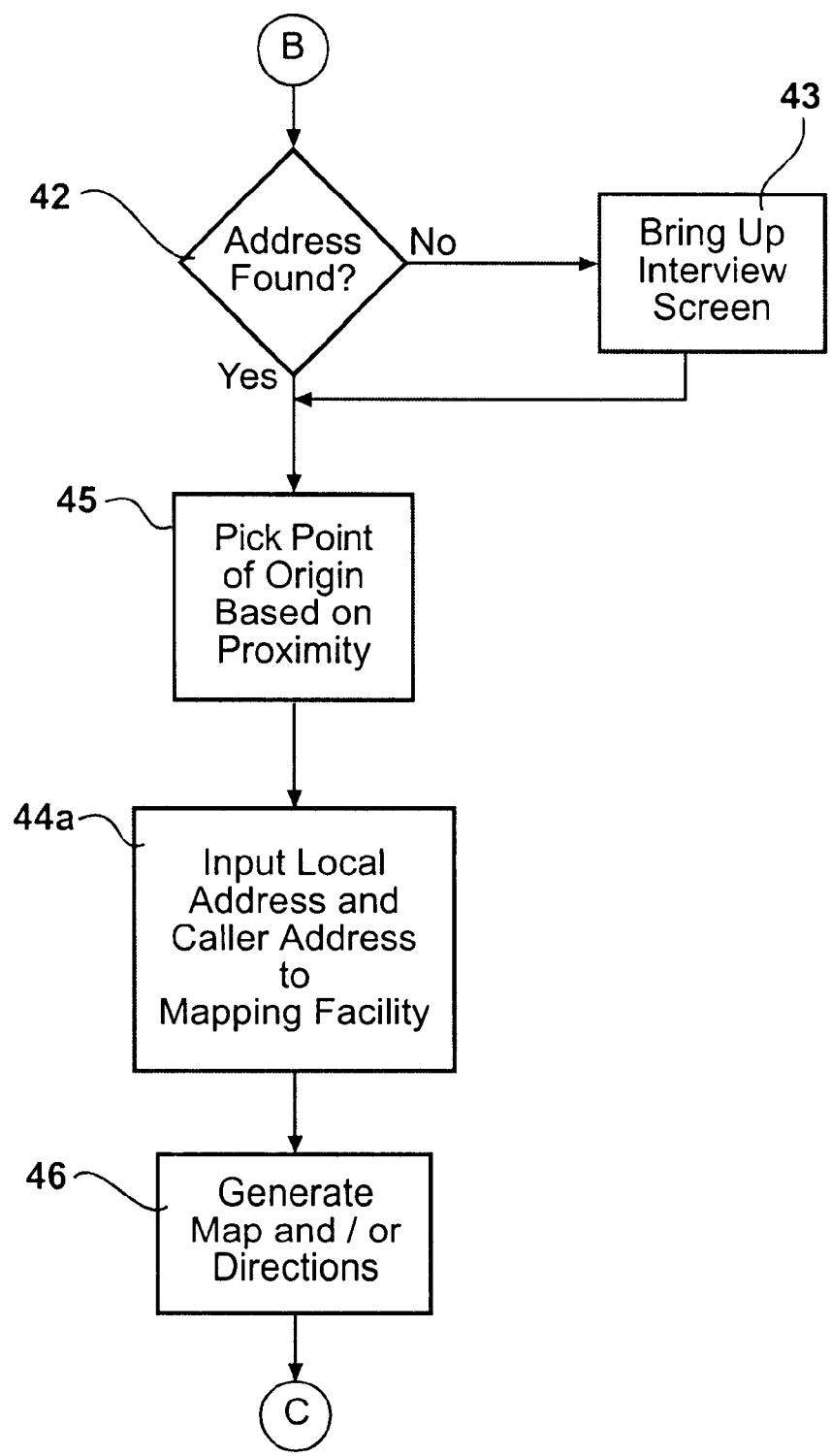
FIG. 2b is a flow chart of further alternate steps in a program like that of FIG. 2.

As shown in FIG. 2(b), in a further variation of the routines of FIG. 2, when there are multiple possible points of origin, such as multiple stores or outlets of the same business establishment, and the computer system 20 is a central installation, accessed by a toll free number perhaps, then once the caller's address is found at 42 or input, at 43, the closest store or outlet can be determined, at 45. That store or outlet is input, at 44(a), as the point of origin and the caller address is input as the destination. The map is then generated at 46 and output, by a fax or email to the selected store or outlet.

In FIG. 3 is shown an alternative programming arrangement used to provide a caller with a map or directions to the facility to which a telephone call is placed. Here the computer installation 20 of FIG. 1 detects the number called at block 50. At block 51, the locally assembled database of customers and/or the reverse white pages stored in memory are searched to determine an address associated with the telephone number that has just been called. If an address is found, then the address is input to the mapping facility at 54 and a map is generated at 56. If an address is not found as determined at the decision block 52, then the interview screen is brought up to the display 24, at block 53, permitting the caller to complete the navigation map at 54.

In the event that the system 20 is used for multistop routing, then each caller location is input both as a destination and as a point of origin until a route is completed. As in commercial mapping software, the routing may be effected with stops being in the order received or in the most efficient sequence.

Figure 4:
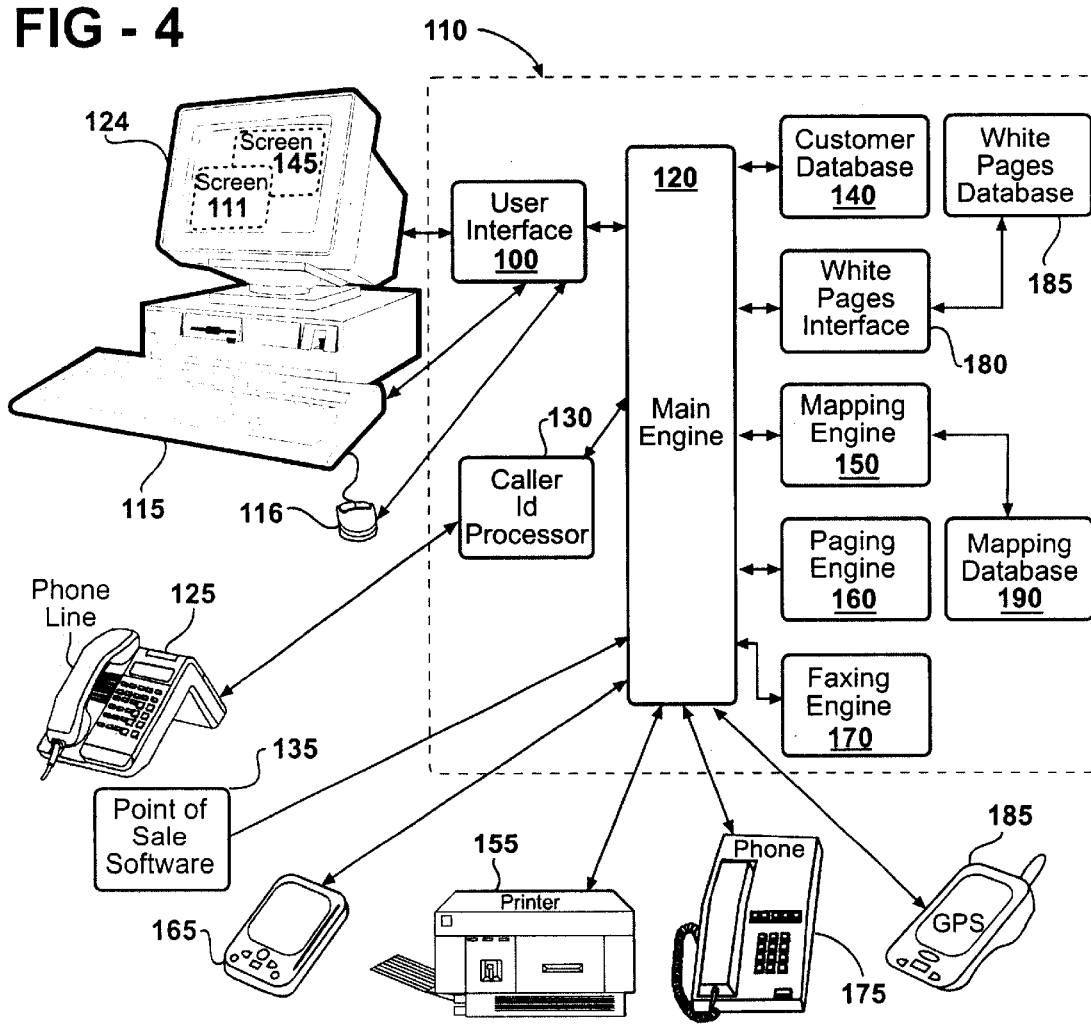
FIG. 4 is a block diagram of a navigation instruction generating system and programming according to principles of the present invention.

In FIG. 4, a navigational instruction generating system 110 includes hardware and software components. The system software includes a main processor engine 120, as formed, typically, by a microprocessor, associated memory and programming. The main processor engine 120 operates in conjunction with a conventional caller identification processor 130, a customer information database 140 and a mapping engine 150 that manipulates mapping data stored in a mapping database 190. System 110 preferably also incorporates several modular electronic communication software installations, among which are a paging engine 160, a faxing engine 170, and a white pages interface 180. White pages interface 180 enables main engine 120 to access a white pages database 185 that contains name, address and telephone number information for a predefined locale.

System 110 further incorporates user interface software 100. Software 100 enables manual manipulation of data to be entered into or presently stored within system 110 by means of a conventional computer keyboard 115 or mouse 116. Software 100 further allows such manipulation to be monitored by means of a conventional computer terminal screen 145 on a display 124.

Caller ID processor 130 receives data from at least one conventional phone line 125. Preferably, processor 130 is configured to simultaneously receive data from multiple phone lines, thereby enabling the map generation process, more fully described hereinafter, to be performed for multiple telephone calls contemporaneously placed from or received by a business.

Information present in customer database 140 may be updated and/or supplemented by point of sale software 135, such as that associated with electronic cash registers and known in the art. This software provides functions ordinarily associated with retail sales.

Maps 320 (FIG. 11) generated by system 110 are output to display media, such as a screen 145 on the display 124 or a conventional printer 155. Information from system 110 may also be output to a conventional handheld personal computer 165 (such as a PalmPilot), a conventional telephone line/modem 175 or a GPS (global positioning system) receiver 185.

Figure 5:
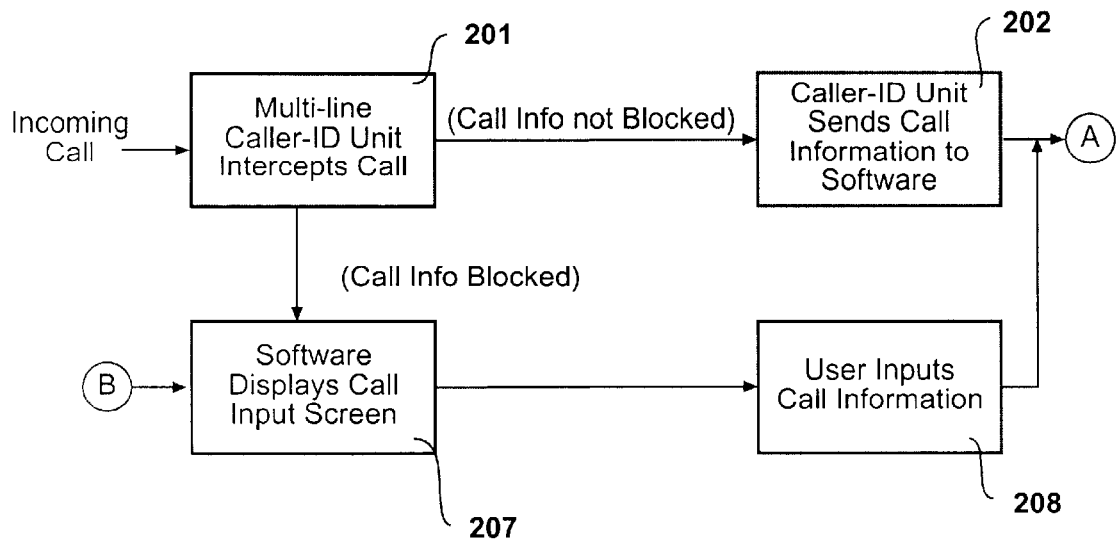
FIG. 5 is a flow chart describing steps performed according to principles of a further embodiment of the present invention in the event of an incoming telephone call.

The system 110 integrates the features of the flowcharts shown in FIGS. 2, 2a and 3. The automatic steps taken by system 110 can best be understood with reference to FIGS. 5, 6 and 7. Referring specifically to FIGS. 5 and 7, shown are flowcharts illustrating the steps taken in the event a customer's order takes the form of an incoming call to the business employing the system 110. Processor 130 (FIG. 4) reads the caller identification information, at 201. This information includes name and/or phone number of the customer placing the incoming call. In the case of enhanced caller ID, it may contain address information as well. This caller information is in turn relayed to main engine 120, block 202.

Referring to FIG. 7, the main engine 120 of FIG. 4 searches an address book, in this case a customer database 140, for an address that may be paired with the name and/or telephone number information received from caller ID processor 130, at 203. If an address corresponding to the caller information is found in database 140, the address is then sent by main engine 120 to mapping engine 150, at 204.

Figure 10:
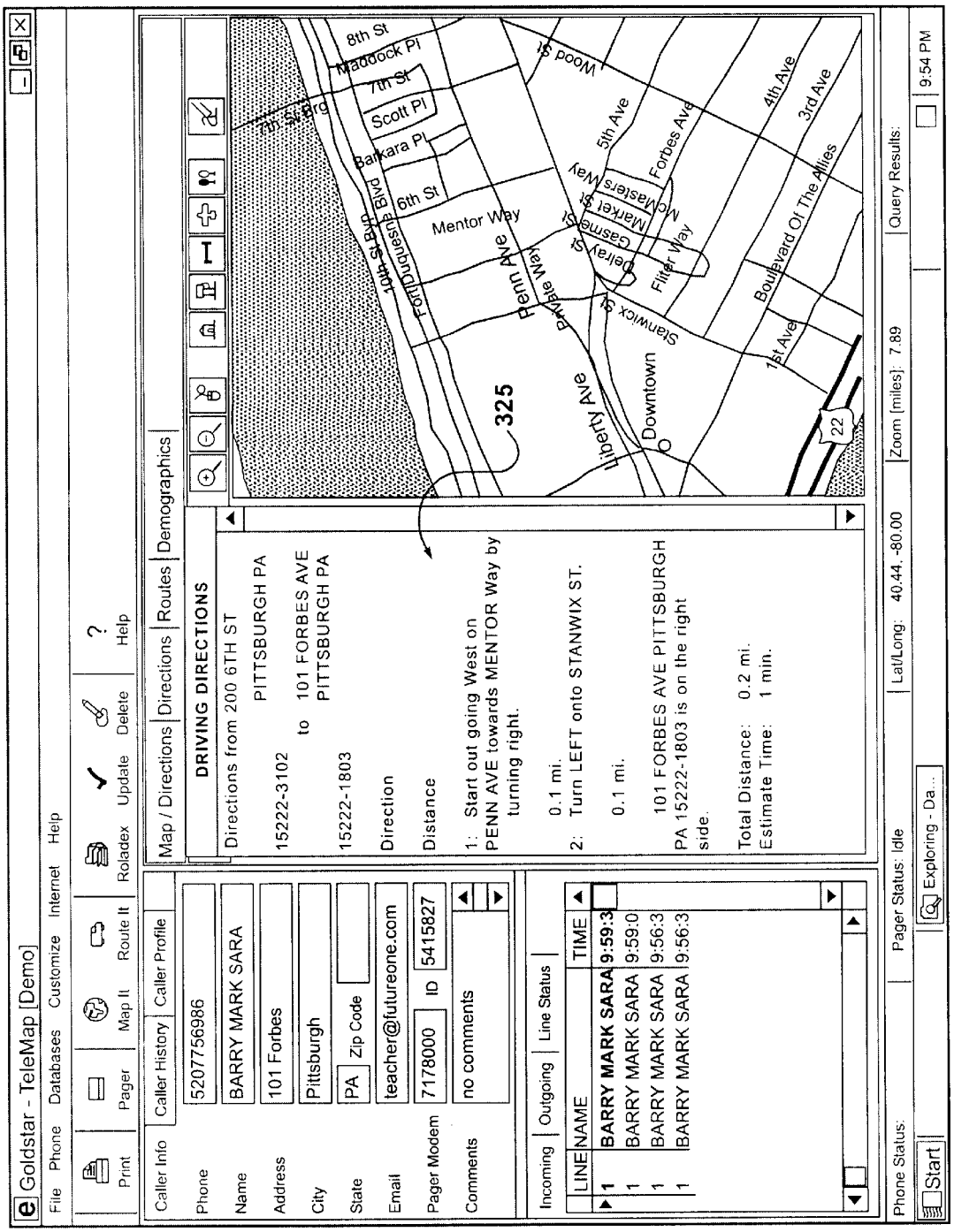
FIG. 10 is an exemplary display screen displaying a map and instructions generated in accordance with the invention.

Here again, the combined function of mapping engine 150 and mapping database 190 is substantially similar to that associated with conventional commercially available mapping software. Accordingly, mapping engine 150 searches mapping database 190 for mapping information associated with the address. Based on this mapping information and mapping information associated with a selectable predetermined origin of delivery, such as the location of he system, at 205 the mapping engine 150 generates a map that will, as in the embodiments of FIGS. 1, 2 and 2a, provide graphical and/or written instructions, useful for example to a delivery driver, on how to travel from the origin to the address. Preferably, variables that allow computation of a subjectively ideal route (i.e., shortest, fastest, etc.) from origin to address may be manually input to the system 110. Alternatively, an ideal route can automatically be determined by a map engine as provided in commercially available mapping software. Likewise, points of interest such as benchmarks, motels, ATMs, gas stations and truck stops can be made a part of the map information or may be part of a commercially available mapping software. Main engine 120 then outputs the map 320 (FIG. 11) produced and/or directions 325 (FIG. 10) by engine 150 to one or more of screen 145, printer 155 or phone line 175, block 206. Like commercially available mapping functions, the mapping feature provides several levels of "zoom" giving greater detail and smaller scale.

Figure 7:
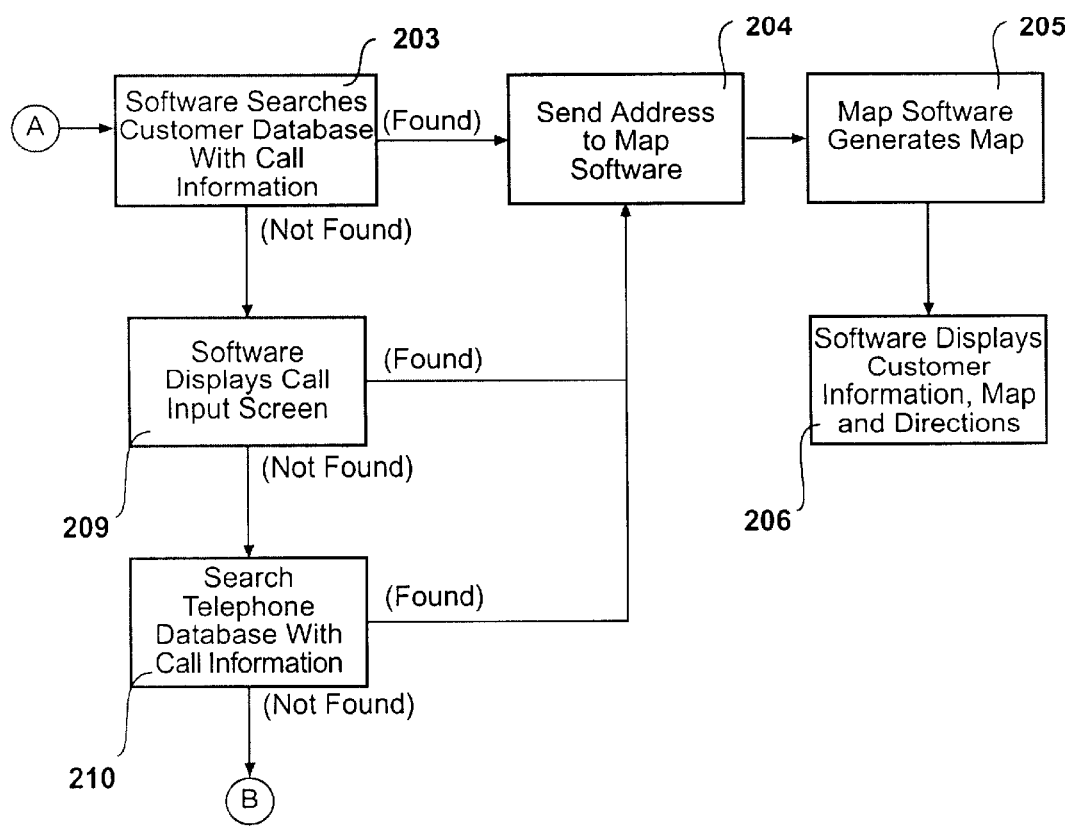
FIG. 7 is a flow chart describing further steps performed according to principles of the embodiment of FIG. 5 in the event of either an incoming or an outgoing telephone call.
Figure 8:
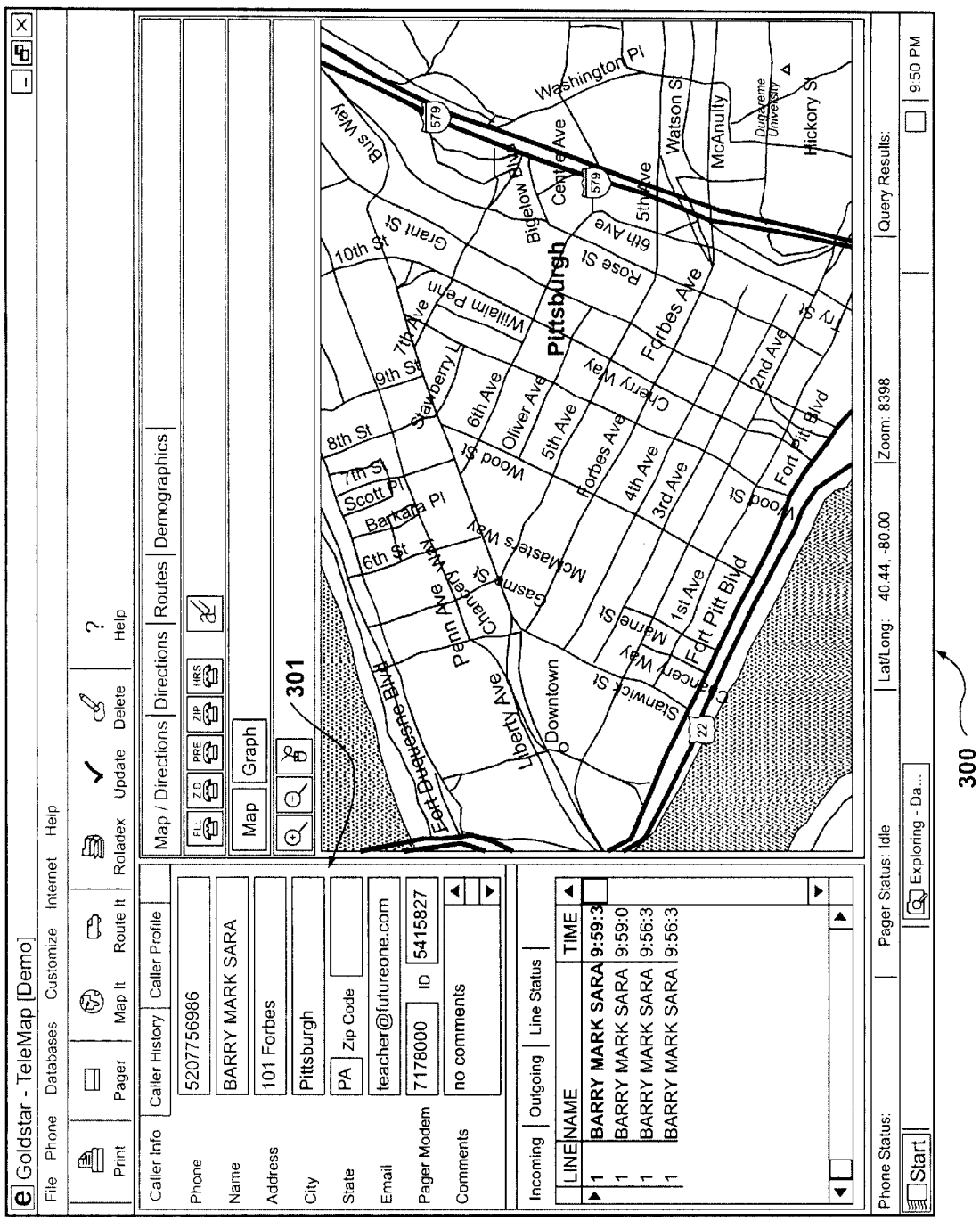
FIG. 8 is a screen showing a data entry field displayed by the terminals used according to principles of the present invention.

As shown in FIG. 5, if caller identification information is blocked by the ordering customer, at 207 user interface 100 provides to computer display 124 the caller information input or interview field 301 of the screen 300, as shown in FIG. 8. Input field 301 (or an entire screen dedicated to this purpose) enables an operator to input caller information such as telephone number, name, and address, directly into system 110 via keyboard 115. Once such information has been entered into input field 301, block 208, main engine 120 retrieves this information and uses the information to search customer database 140, at 203 of FIG. 7, and the map generation process continues as described above and as shown in FIG. 7.

Referring again to FIG. 7, if main engine 120 is unsuccessful in locating a matching address in customer database 140, at block 209, main engine 120 checks to see if address information has been entered into call input field 301. If an address has been so entered, main engine 120 sends this address information to mapping engine 150, block 204, and the map generation process continues as described above and as shown in FIG. 7.

If no such address information has been entered into the interview field 301, main engine 120 accesses white pages database 185 via white pages interface 180 in an attempt to locate an address corresponding to the available name or telephone number information, block 210. If corresponding address information is successfully located in white pages database 185, such address information is routed to mapping engine 150, block 204, and the map generation process continues as described above and as shown in FIG. 7.

If at 210, no such matching address is found in white pages database 185, user interface 100 displays the interview field 301, block 207 of FIG. 5, and an address must be manually entered at 208. Once the address is manually entered, at 208 of FIG. 5, customer database 140 is updated with the new customer information. Main engine 120 may then retrieve this updated address information from customer database 140, block 203, or may directly send the address to mapping engine 150, at 204, whereupon the map generation process continues as described above and as shown in FIG. 7.

Figure 6:
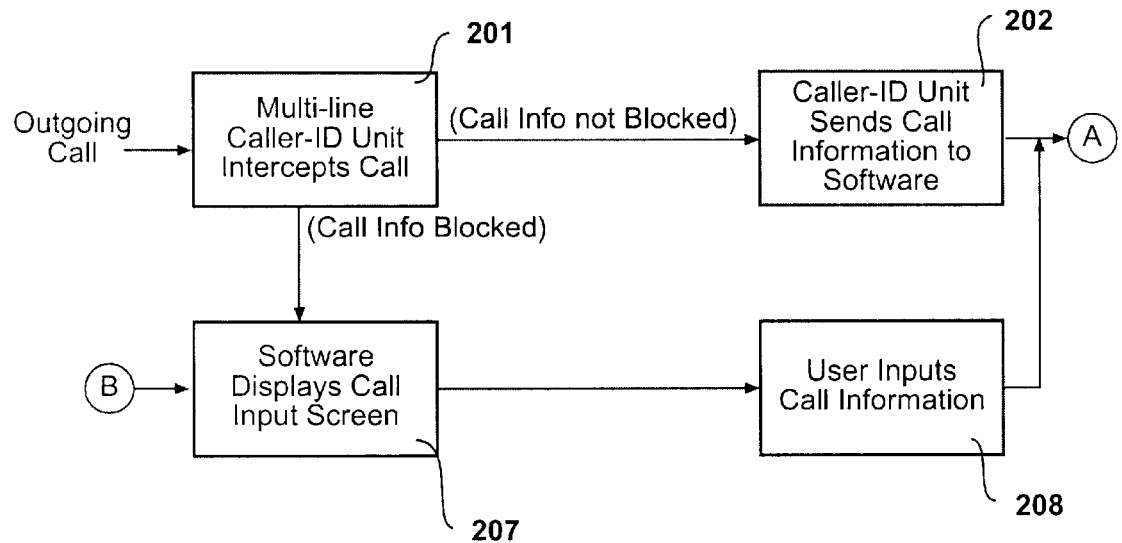
FIG. 6 is a flow chart describing further steps performed according to principles of the embodiment of FIG. 5 in the event of an outgoing call.

Referring now to FIGS. 6 and 7, shown are flowcharts illustrating the steps taken in the event an employee of a business employing system 110 places an outgoing call to a customer or other call recipient. At 221, the multi-line serial device unit 130 records the outgoing numbers being dialed. As with the system of FIG. 1, the software of this system polls the multi-line unit 130 and the numbers dialed are transferred at 222 to the main engine 120.

Referring to FIG. 7, main engine 120 searches the customer database 140 for an address that may be paired with the outgoing dialed number. If an address corresponding to the information is found in the database 140, the address is then sent by the main engine 120 to the mapping engine 150, block 204.

The combined function of mapping engine 150 and mapping database 190 is substantially similar to that associated with conventional mapping software known in the art, such as that employed by the MapQuest® World Wide Web service. Accordingly, mapping engine 150 searches mapping database 190 for mapping information associated with the address. Based on this mapping information and mapping information associated with a selectable predetermined origin of delivery, mapping engine 150 generates a map that will provide graphical and/or written instructions to a delivery driver on how to travel from the origin to the address, block 205. Preferably, variables that allow computation of a subjectively ideal route (i.e., shortest, fastest, etc.) from origin to address have been manually input to system 110 or are available in the software used. Main engine 120 then outputs the map produced by engine 150 to one or more of display 124, printer 155 or phone line 175, block 206. Phone line 175 can be used to provide the information to a remote site such as a delivery starting point, warehouse or geographically selected retail outlet.

Figure 12:
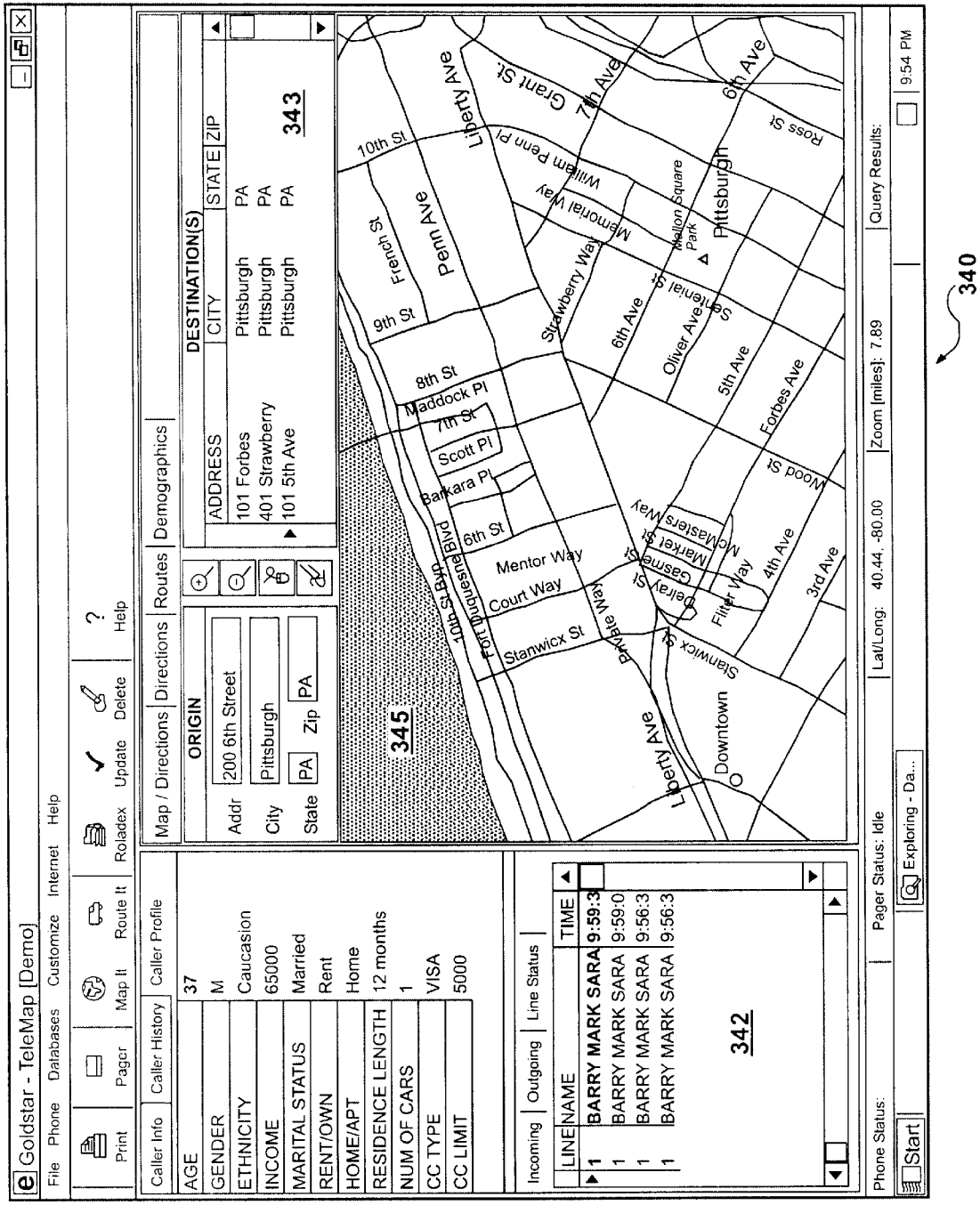
FIG. 12 is another exemplary screen that shows routing of a multiple stop delivery route.

The screen 340 used for multistop routing is shown in FIG. 12. From the field 342 that identifies the calls received, the delivery stops to be made are highlighted and with a click of the mouse are transferred to the field 343 to build the delivery route that is then automatically mapped in the field 345. Routing can be effected either in the order of calls entered or in the most efficient order.

Referring to FIG. 7, if the main engine 120 is unsuccessful in locating a matching address in the customer database 140, main engine 120 checks to see if address information has been entered by the caller into the call input field 301, block 209. If an address has been so entered, the main engine 120 sends this address information to the mapping engine 150, block 204, and the map generation process continues as described above and as shown in FIG. 7.

If no such address information has been entered into the interview field 301, the main engine 120 accesses the white pages database 185 via the white pages interface 180 in an attempt to locate an address corresponding to the available name or telephone number information, at 210. If corresponding address information is successfully located in the white pages database 185, such address information is routed to the mapping engine 150, at 204, and the map generation process continues as described above and as shown in FIG. 7.

If no such matching address is found in the white pages database 185, the user interface 100 places input field 301 upon the screen 111, block 223, and an address must be manually entered. Once the address is manually entered, block 224, the customer database 140 is updated with the new customer information. Main engine 120 may then retrieve this updated address information from customer database 140, block 203, or may directly send the address to mapping engine 150, block 204, whereupon the map generation process continues as described above and as shown in FIG. 7.

Figure 9:
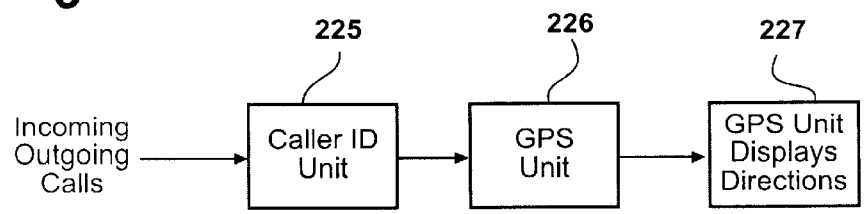
FIG. 9 is a flow chart showing steps performed according to principles of an alternative embodiment of the present invention in the event of either an incoming or an outgoing telephone call.

In an alternative embodiment, as shown in FIG. 9, address information associated with an incoming call from or an outgoing call to a customer may be provided by the telephone company to or otherwise received by the processor 130, at 225. The address information may further include the name of the calling customer. The processor 130 downloads the address information directly to modem/phone line 175, handheld PC 165 and/or GPS receiver 185, block 226. Alternatively, the main engine 120 receives such address information from the processor 130 and delivers such address information directly to modem/phone line 175, handheld PC 165 and/or GPS receiver 185. In this embodiment, therefore, the mapping function may be performed offsite and external to system 110, block 227. Where the information retrieval of the system 110 is provided as a service remote from either the caller or call recipient, then telephone line 175 is used to deliver the retrieved information to one of the caller and call recipient.

The main engine will retrieve incoming calls and search for the caller's address and display geographical maps and the caller's call history information instantly, before an operator picks up the phone. When caller ID is unavailable or blocked, manual entering of phone numbers, addresses, and other fields will also perform the same functions.

Figure 14:
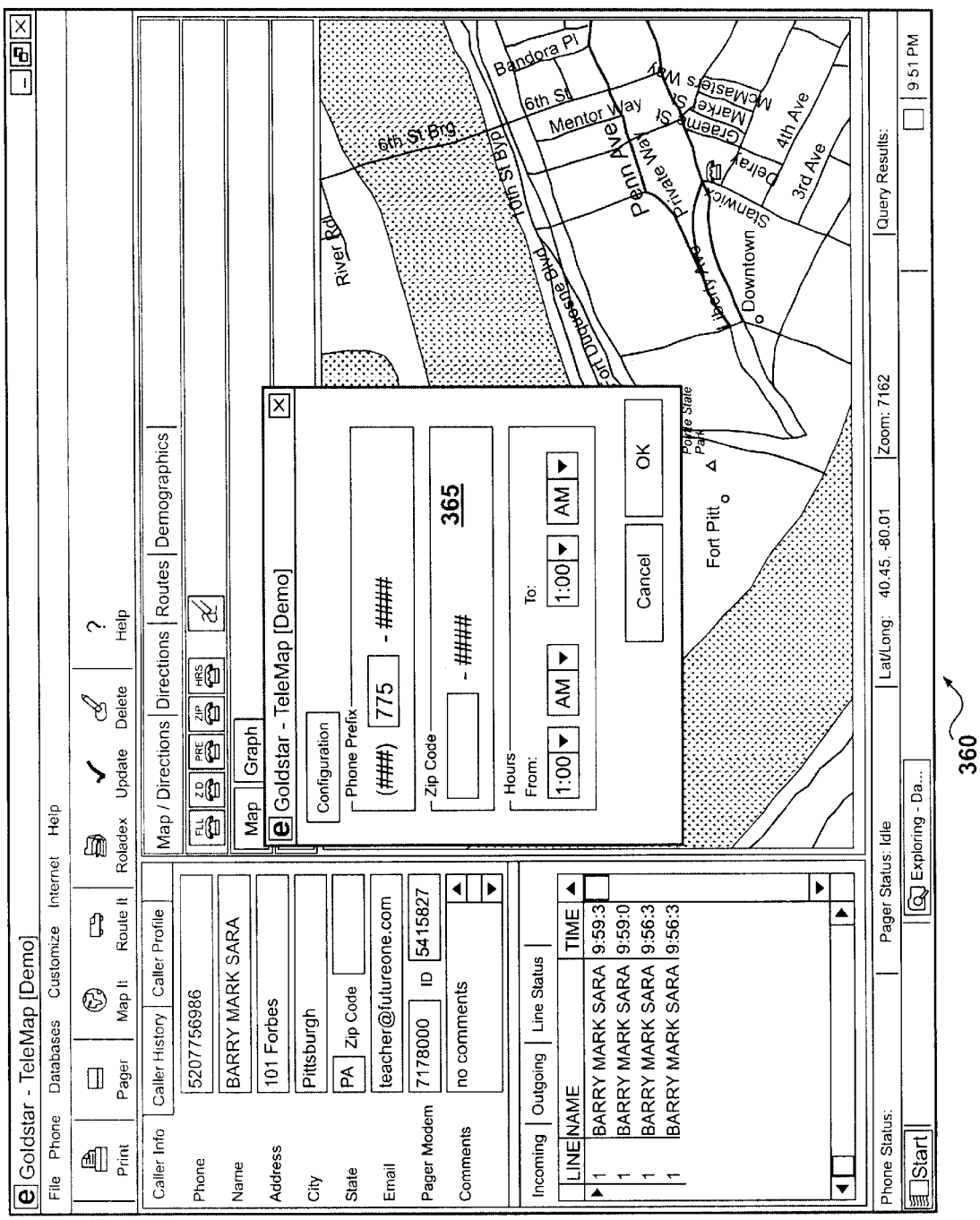
FIG. 14 is an additional exemplary screen that shows a window by which prior calls are sorted on the basis of phone number prefix.

Additionally, customer locations can be displayed on digital maps to show where services are coming from geographically. Thousands of points can be placed on a digital map to help marketing, data analyzing or research to assist businesses in understanding their market area. Each function of system 110 may have a set of standard reports that may be run on demand. Mailers, coupons, customizable form letters, and envelopes can be generated from caller databases. Caller data could also be exported into customizable reports and into any format (Microsoft® Excel, Microsoft® Word, etc.). Screen 360 of FIG. 14 shows window 365 for entry of a phone prefix on the basis of which a sort is made showing calls made with that prefix.

Figure 15:
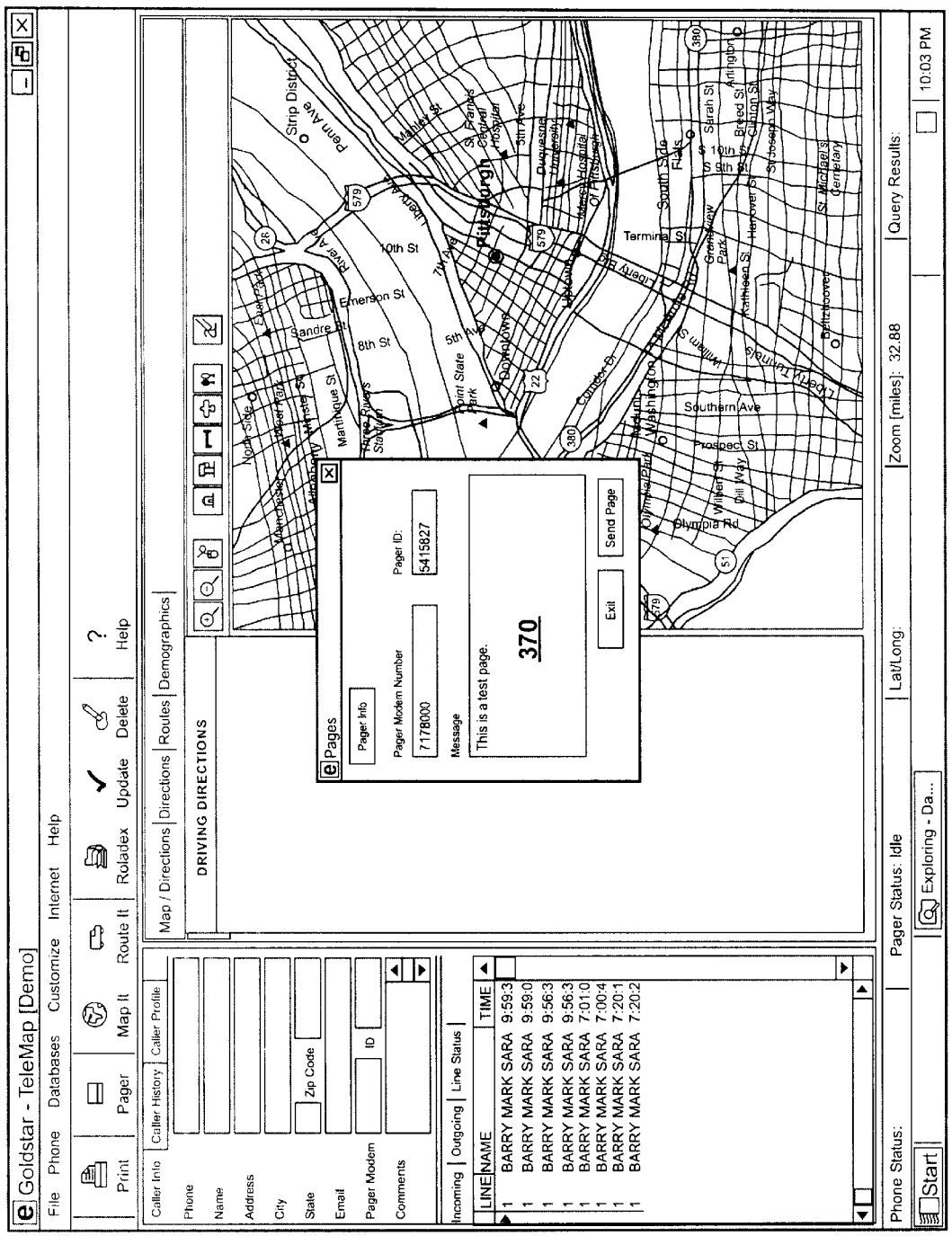
FIG. 15 is an exemplary screen that shows a window for use in addressing a pager.

Further, when modules such as GPS receiver 185 are used in conjunction with system 110, GPS hardware at the business and in the driver's vehicle enables driver monitoring via satellite technology such that system 110 enables displaying the driver's location in real time on an electronic map. In other words, geographic location retrieved as above can be input to a GPS receiver 185 to provide GPS mapping and instructions typical of automobile navigational systems presently commercially available. When paging engine 160 is incorporated by system 110, customized commands can be set up to page or take messages when the business is busy. Screen 370 of FIG. 15 shows window 375 to receive a pager number and message to be sent. Callers can leave a message, page someone, send e-mail or request a call back from the business. Such a function will also allow blocking of calls. Audible messages may also be employed to alert the employee as to the identity of the caller. Drivers may also be paged with messages while en route.

The functionalities so far described are capable of integration into a commercial telephone software and hardware package. Where delivery is the primary or a major part of a business's day-to-day activity, this is desirable. The programming described above and the further features discussed below can be achieved using a tool such as Delphi 4 or Delphi 5 available from Inprise Corp., Scotts Valley, Calif.

In addition to the map and directions functions described, an integrated system logs each incoming and each outgoing call for the business's records. Logs may show the history of incoming calls and also which employee made outgoing calls and at what time. These types of logs enable the business to budget and manage monthly phone bill expenses. When faxing engine 170 is incorporated by system 110, incoming and outgoing faxes can be recorded and saved digitally. Search functions allow employees to quickly and easily recall stored faxes.

Figure 11:
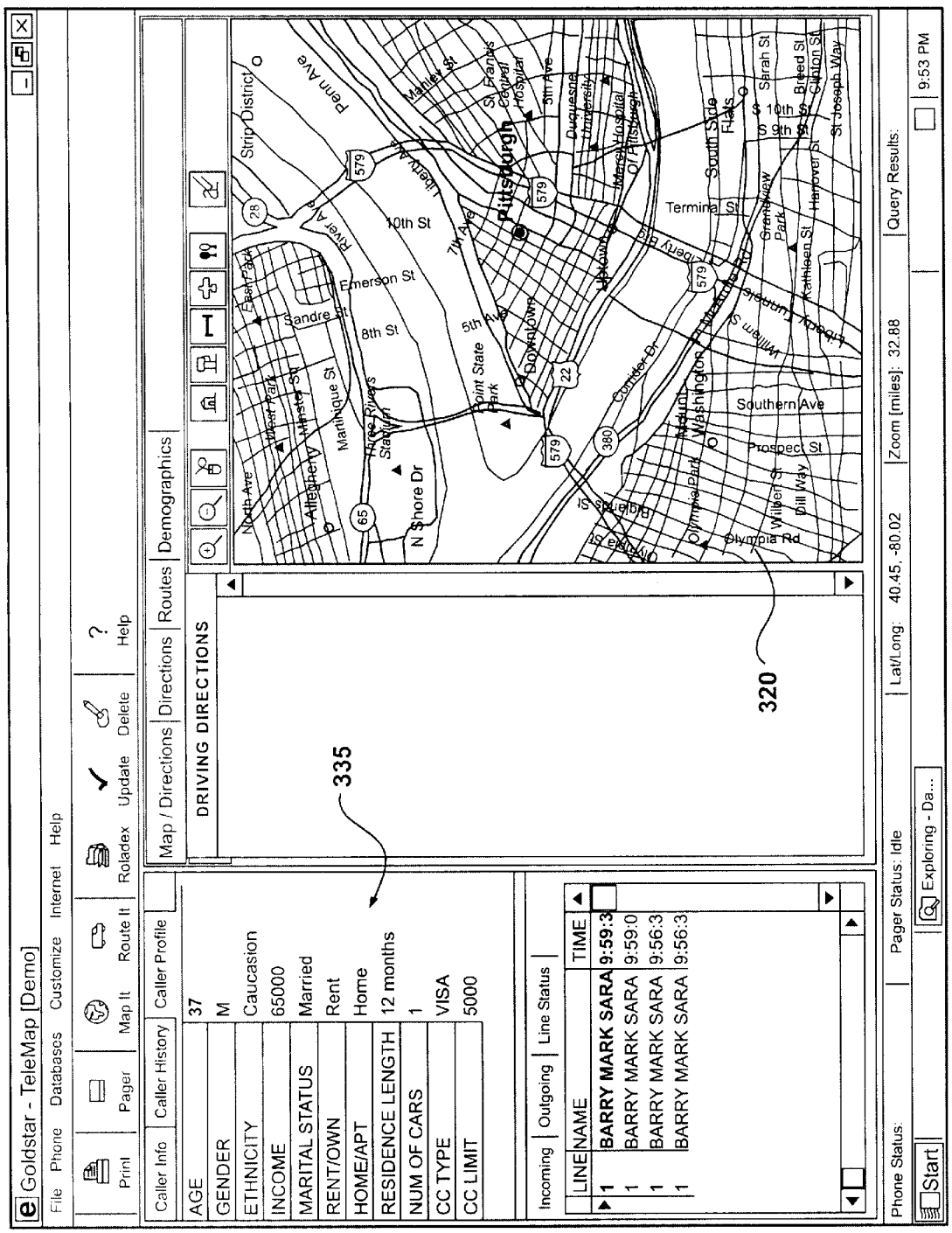
FIG. 11 is an exemplary screen that includes caller profile information.

With each of the embodiments discussed above with respect to the handling of incoming calls, an operator will take an order after the mapping and directions have been generated. Point of sale software ordinarily employed in retail can be associated with this system. In addition to the map and directions, caller profile information 335 relating to the caller may be made available as indicated at display screen 350 (FIG. 11). Such caller profile information available commercially, such as for example "infoUSA" from infoUSA, Inc., Omaha, Nebr. (www.infoUSA.com), includes income, gender, length of time at residence, home value, credit card type, credit card credit available, marital status, mortgage information, ethnicity, expendable income, net worth, automobile price class, number of automobiles owned and other information. From records made during previous calls, credit card number and other relevant information is made available to the operator taking the call. Other information that may be stored for use at this time by the operator or at another time for other purposes includes email address, pager number, preferences, and a history of past purchases. Specifically targeted marketing is made possible with available information.

Figure 13:
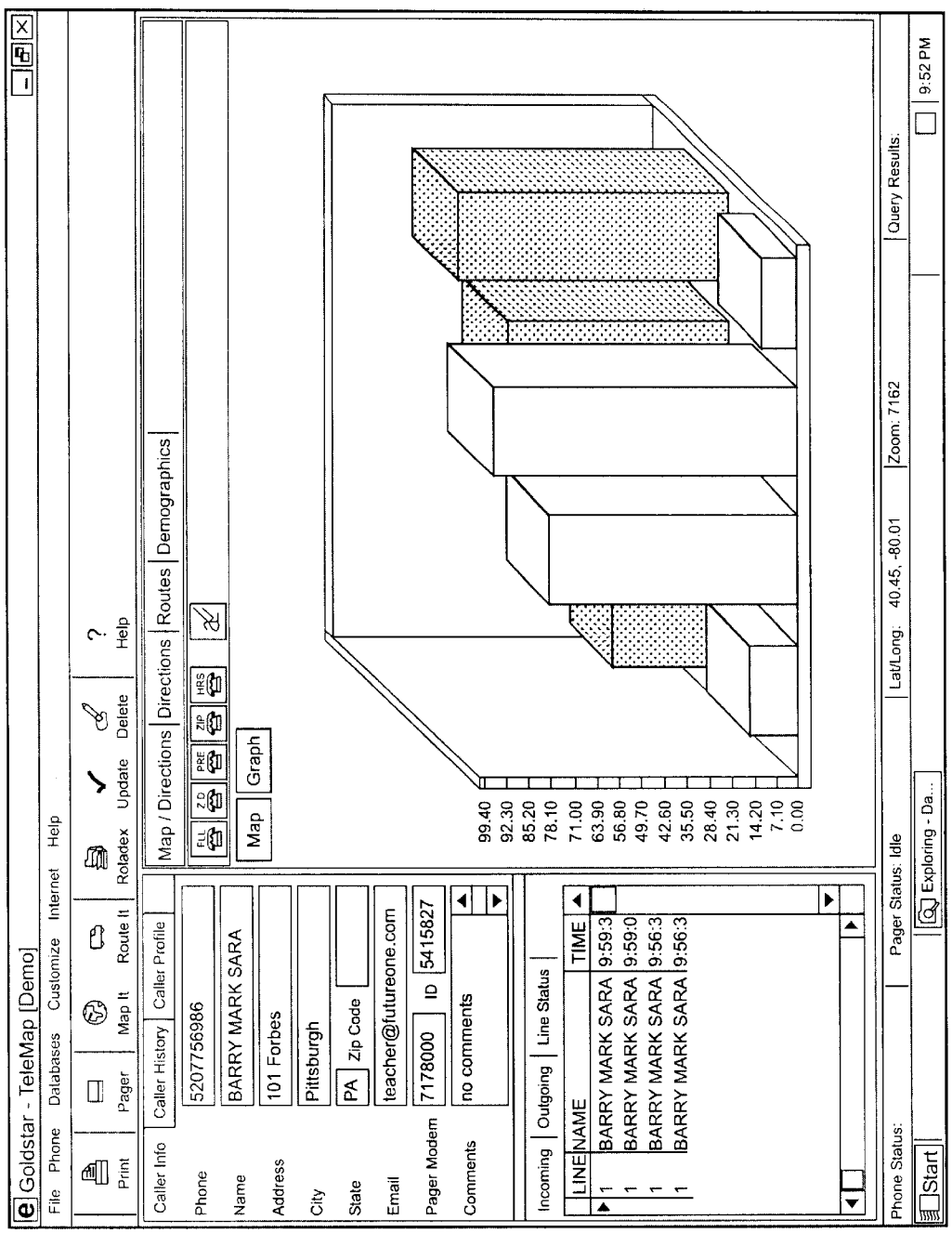
FIG. 13 is an exemplary screen that shows presentation of data graphically.
Figure 16:
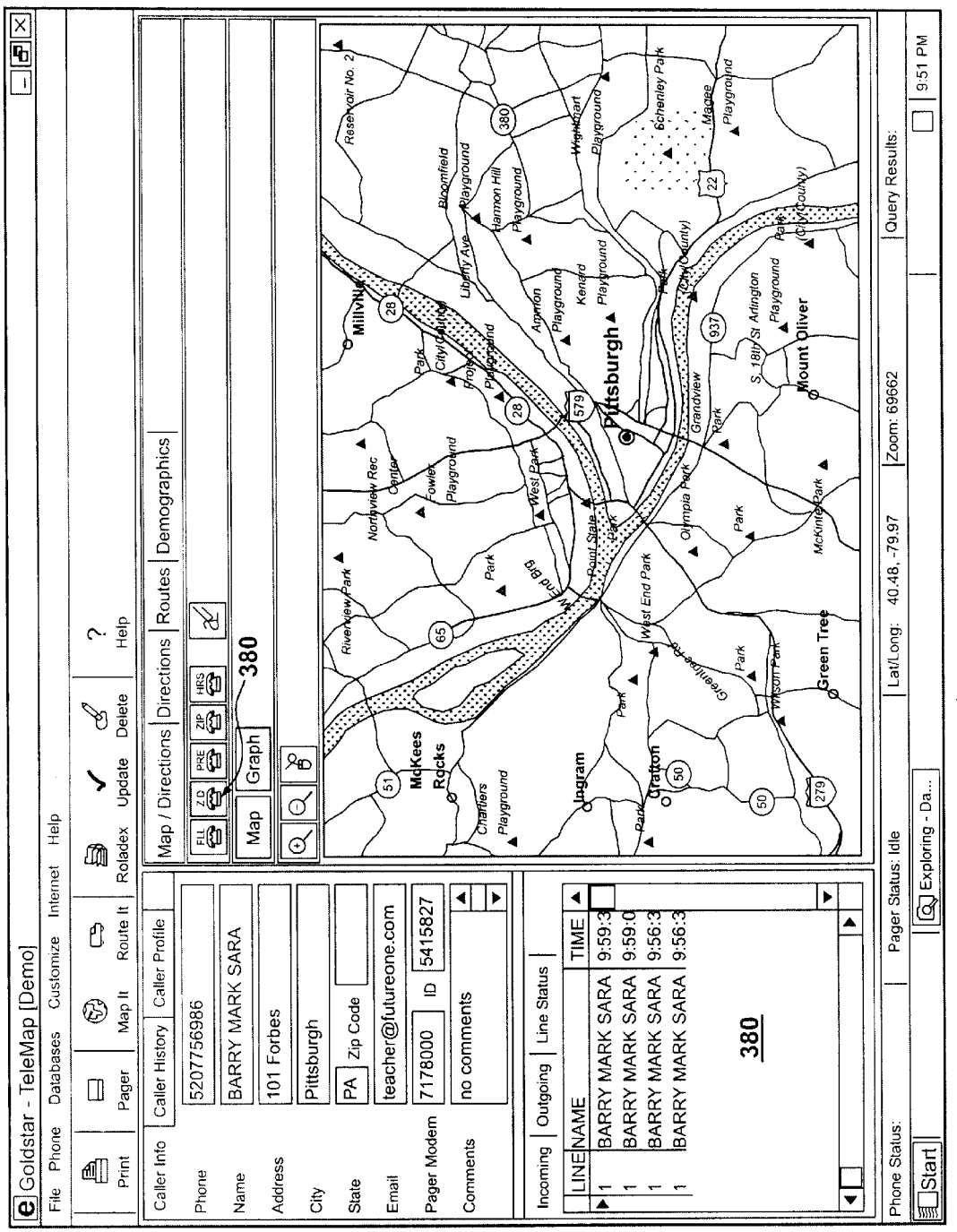
FIG. 16 is still another exemplary screen showing the preparation of a seven-day history of calls.

Geographical information generated and stored has further uses as well. A business is able to identify those locales where most sales have occurred in the past. This enables changes in marketing to improve sales performance in other locales. Where a business has multiple sites from which deliveries are made, incoming calls are assigned to one such site based, for example, on proximity. Delivery instructions are automatically routed to the appropriate site. If a business limits its deliveries to a geographical area, or charges a higher fee for deliveries outside of that area, this can be shown to the operator taking the call. Information provided to the user can be supplied in textual format or graphically by use of the graphing function available through the main engine 120 and as shown in FIG. 13.

Where large PBX switches or other multi-line installations are employed, phone line status can be shown on a real time basis and phone logs can be displayed in real time for review by managers (or parents in the home computer setting.) Other computer functions such as sorting, creating of customized reports, database editing, and Rolodex type searches are readily available. Such sorting as by "all calls," time of day, day of the week, last thirty days, area code, prefix, delivery area and zip code is enabled in the present embodiment. Screen 380 of FIG. 16 shows the "7.0" button 385 depressed to generate in the field 389 a report of calls over the past seven days. Tabs "Incoming" and "Outgoing" allow selection of calls received or calls placed in that period. The "line station" permits viewing, in real time, the current status of the lines of a multiline system. As presently structured, the software of this system allows both TAPI and hardware compatibility, enabling use with standard telephone protocol (TAPI), serial port and multi-line units, large PBX switches and other hardware. The system allows customization. Delivery areas, as mentioned above, can be defined. Points of interest can be noted on maps (such as gas stations, truck stops, ATM machines, motels and the like).

Although the invention has been described in terms of the illustrative embodiments, it will be appreciated by those skilled in the art that various changes and modifications may be made without departing from the spirit or scope of the invention as set forth in the appended claims. For example, while the preferred embodiments described above speak in terms of conventionally caller ID, it will be appreciated that the invention can be implemented to function with automatic number identification (ANI).

What is claimed is:

1. A standalone computer system for generating travel directions from a point of origin, corresponding to a location of said computer system, to a destination that corresponds to a geographic location associated with telephone number identification information representative of an incoming or outgoing telephone call comprising:

i) a telephone receiver;
   ii) a database containing information correlating said telephone number identification information with a corresponding geographic location, said database includes:
      a) a locally assembled address book, and
      b) telephone directory information;
   iii) navigation software operative to provide a map or navigation directions between said geographic location associated with the telephone number identification information and the location of the computer system;
   iv) an output device; and
   v) a computer program operative to:
      a) control said computer system to detect and interpret incoming or outgoing telephone number identification information associated with a telephone call;
      b) control said computer system to first search said locally assembled address book in said database using the telephone number identification information to obtain information representative of a geographic location associated with the telephone number identification information, and
      subsequently search said telephone directory information to obtain information representative of a geographic location associated with the telephone number identification information whenever said information in not found in said locally assembled address book;
      c) control said computer system to employ said navigation software to automatically provide said map or navigation directions between said point of origin and the geographic location associated with the telephone number identification information; and
      d) control the computer system to selectively provide said map or navigation directions to said output device in a desired media.

2. The computer system of claim 1 wherein the database includes address information associated with the geographic location of the destination.

3. The computer system of claim 1 wherein the computer program is responsive to information obtained from said database by supplying said information to said navigation software.

4. The computer system of claim 1 wherein the computer program is further operative to control the computer system to automatically display an interview screen for user input when said telephone number identification information is not found in said database.

5. The computer system of claim 1 wherein the navigation software comprises mapping software responsive to point of origin information and destination information to generate a map between the said point of origin and the destination.

6. A method of generating, by computer, travel directions from a first location to the location of a telephone caller including:
   (a) providing a stand-alone computer installation at said first location, said stand-alone computer having a database that includes:
      1) a locally assembled address book, and
      2) telephone directory information;
   (b) receiving a telephone call at said first location;
   (c) detecting caller identification information electronically associated with said received telephone call;
   (d) providing navigation software in the computer installation;
   (e) programming said navigation software with the location of said first location corresponding to a point of origin;
   (f) automatically retrieving destination information corresponding to the location of the telephone caller as derived from the caller identification information electronically associated with a telephone call from the caller by:
      1) first searching said locally assembled address book in said database using the caller identification information, and
      2) subsequently searching said telephone directory information to obtain destination information relative to situs of the telephone caller when said destination information is not found in the locally assembled address book;
   (g) automatically communicating destination information corresponding to the location of the telephone caller as derived from the caller identification information electronically associated with a telephone call from the caller to said navigation software; and
   (h) outputting navigation information for navigating from said first location to the location of the telephone caller as developed by the navigation software.

7. The method of claim 6, further comprising providing, by a program routine responsive to the presence of caller identification information electronically associated with a received telephone call, the steps of looking for a caller's address in at least one associated database, and if present, causing retrieval of the caller's address information from the associated database for use by the navigation software, and displaying an interview screen if a caller's address is not present in the at least one associated database.

8. The method of claims 6, wherein providing navigation software in the computer installation comprises providing textual travel direction producing software responsive to point of origin information and destination information, and wherein step (h) comprises using said textual travel direction producing software to generate and output said textual directions from a point of origin represented by said point of origin information to a destination represented by said destination information.

9. A method for generating navigation information automatically with respect to a location to which a telephone call is placed, as a destination, comprising:
   (a) providing a stand-alone computer installation connected to receive a telephone number of a call being placed from said computer installation;
   (b) providing a database of address information associated with telephone numbers within said computer installation, said database comprising:
      1) a locally assembled address book, and
      2) telephone directory information;
   (c) providing said computer installation with navigation software for generating navigation information from a point of origin to a destination corresponding to said location to which a telephone call is placed;
   (d) using said computer installation for performing the steps of:
      (i) retrieving address information from said database corresponding to a telephone number to which a call is placed by:
         1) first searching said locally assembled address book in said database using said telephone number, and
         2) subsequently searching said telephone directory information to obtain address information relative to the location associated with the telephone number called when said address information is not found in the locally assembled address book;
      (ii) providing the retrieved address information as a destination to said navigation software;
      (iii) providing a point of departure to the navigation software; and
      (iv) outputting navigation information generated by the navigation software for navigating from said point of departure to said destination,
   whereby a telephone caller is able to obtain navigation information from the point of departure to the situs of the location called.

10. The method for generating navigation information according to claim 9, wherein step (d) (iii) comprises providing the address of the computer installation as the point of departure.

11. A method of generating travel directions from a location receiving a telephone call to a location of a telephone caller comprising:
   (a) providing a stand-alone computer installation connected to receive a telephone call;
   (b) receiving a telephone call;
   (c) detecting caller identification information electronically associated with said received telephone call including at least one of a telephone number associated with a calling telephone and a name associated with said calling telephone;
   (d) providing a database in the computer installation, said database comprising:
      1) a locally assembled address book, and
      2) telephone directory information;
   (e) automatically retrieving an address from said database associated with at least one of the telephone numbers and a name associated with said calling telephone by:
      1) first searching said locally assembled address book in said database using said telephone number, and
      2) subsequently searching said telephone directory information to obtain said address relative to the location associated with the telephone number called when the address is not found in the locally assembled address book; and (f) generating travel directions in response to the address automatically retrieved and at least one further address input to the computer installation.

12. The method of claim 11, wherein the at least one further address of step (f) is an address associated with the situs of the computer installation.

13. The method of claim 11, further comprising using a software routine, choosing the at least one further address.

14. The method of claim 13, wherein choosing the at least one further address includes choosing the at least one further address on the basis of a relationship of available further addresses with the address automatically retrieved.

15. The method of claim 14, wherein the step of choosing on the basis of a relationship comprises choosing the at least one further address on the basis of proximity to the address automatically retrieved.

16. The method of claim 11, further comprising assembling multiple delivery routings.

17. The method of claim 11, further comprising assembling multiple delivery routes from the addresses of callers.

18. A standalone system for generating travel directions from a point of origin, corresponding to a location of said system, to a destination that corresponds to a geographic location associated with telephone number identification information representative of an incoming or outgoing telephone call comprising:

a) a computer system configured to detect and interpret telephone number identification information associated with an incoming or outgoing call being placed from the computer system;

b) a database containing address information associated with said telephone number identification information, said database comprising:
   a) a locally assembled address book, and
   b) telephone directory information;

c) said computer system including navigation software for generating navigation information from a point of origin to a destination;

d) said computer system being programmed to:
   i) first search said locally assembled address book in said database, and
      subsequently search said telephone directory information to retrieve address information associated with said telephone number identification information obtained from said call being placed from the computer system;
   ii) provide the retrieved address information as a destination to said navigation software;
   iii) provide a point of origin to the navigation software; and
   iv) output navigation information generated by the navigation software from the of origin to the destination whereby a user is able to obtain navigation information from a preselected situs to the situs of the location called.

19. The system for generating travel information according to claim 18 wherein the computer system is programmed to provide the address of the computer system as the point of origin, whereby a user is able to obtain navigation information from the user's situs to the situs of the location called.

20. A system for generating travel directions from a first location to location of a telephone caller comprising:

a) a stand-alone computer system including:
   i) a modem connection or communication port connected to receive a telephone call;
   ii) a database comprising:
      a) a locally assembled address book, and
      b) telephone directory information;
   iii) a computer program operative to:
      a) control said computer system to detect and interpret incoming telephone number identification information associated with a telephone caller including at least one telephone number and a name associated with said telephone caller;
      b) control said computer system to first search said locally assembled address book in said database using the telephone number identification information derived by said first computer program, and subsequently search said telephone directory information to automatically obtain an address that is associated with said at least one of the telephone number and name associated with the telephone caller; and
   iv) navigation software operative to control the computer installation to generate travel directions in response to the address automatically obtained and at least one further address input to the computer system.

21. The system of claim 20 wherein the at least one further address is an address associated with the situs of the computer system.

22. The system of claim 20 further comprising a software routine for choosing the at least one further address.

23. The system of claim 22 wherein the software routine for choosing the at least one address includes instructions for choosing the at least one further address on the basis of a relationship of available further addresses with the address automatically retrieved.

24. The system of claim 23 wherein the relationship is proximity to the address automatically retrieved.

25. The system of claim 20 further comprising a multiple delivery routing program, the at least one further address including destination addresses derived from other callers such that a delivery route is sequentially assembled from an initial point of origin to a caller address and from said caller address to a further caller address.

26. The system of claim 20 further comprising a computer program operative to control the computer system to assemble multiple delivery routes from the addresses of telephone callers.

27. A stand-alone computer system for generating information automatically with respect to a telephone call between two locations comprising:

a) a computer program operative to control said computer system to extract telephone number identification information from a call in progress;

b) a database of additional information associated with the telephone number identification information and containing the additional information in association with the telephone number identification information, said database comprising:
   1) a locally assembled address book, and
   2) telephone directory information;

c) the computer system including a computer program operative to:
   i) control the computer system to retrieve the information associated in the database with the telephone number identification information of the call in progress by:

1) first searching said locally assembled address book in said database using the said telephone number, and
2) subsequently searching said telephone directory information to obtain said address relative to the location associated with the telephone number called when the address is not found in the locally assembled address book; and ii) control said computer to output the additional information generated.

28. The system according to claim 27 wherein the computer system is programmed to display the additional information during the course of the telephone call in progress.

29. The system according to claim 27 wherein the additional information contains caller profile information relating to the entity from whose telephone the call in progress was made.

30. The system according to claim 27 wherein the additional information contains caller profile information relating to the entity whose telephone number is being called.

31. The system according to claim 27 wherein the additional information comprises navigational information.

32. The system according to claim 31 wherein the navigational information is directional information between the location of the calling telephone and the called telephone.

33. The system according to claim 27 wherein the situs of the computer system database is remote from the calling telephone and the telephone number being called.

34. The system according to claim 27 wherein the computer system is programmed to output the additional information to a location of at least one of the telephones engaged in the call in progress.

* * * * *